(12) United States Patent
Teh et al.

(10) Patent No.: US 10,306,880 B2
(45) Date of Patent: Jun. 4, 2019

(54) ADMINISTRATION OF A WILDLIFE REPELLANT TO PROTECT AN ENTITY

(71) Applicant: Intel Corporation, Santa Clara, CA (US)

(72) Inventors: Hong Wei Teh, Bayan Lepas (MY); Tomer Rider, Naahryia (IL)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 15/087,424

(22) Filed: Mar. 31, 2016

(65) Prior Publication Data
US 2017/0280701 A1    Oct. 5, 2017

(51) Int. Cl.
*A01M 29/18*    (2011.01)
*B60Q 5/00*    (2006.01)

(52) U.S. Cl.
CPC ............ *A01M 29/18* (2013.01); *B60Q 5/005* (2013.01)

(58) Field of Classification Search
CPC ................................ A01M 29/18; B60Q 5/005
See application file for complete search history.

(56) References Cited

U.S. PATENT DOCUMENTS

| | | | | |
|---|---|---|---|---|
| 4,965,552 A * | 10/1990 | Price | ..................... | A01M 29/16 340/566 |
| 6,016,100 A * | 1/2000 | Boyd | ..................... | A01K 15/02 119/712 |
| 6,134,184 A * | 10/2000 | Waletzky | .............. | A01M 29/16 116/224 |
| 7,324,408 B2 * | 1/2008 | Cilliers | .................. | A01M 29/18 340/384.2 |
| 7,450,473 B1 * | 11/2008 | Estrada | .................. | A01M 29/18 340/384.2 |
| 2006/0233049 A1 * | 10/2006 | Cilliers | .................. | A01M 29/18 367/139 |
| 2012/0113754 A1 * | 5/2012 | Husseiny | .............. | A01M 29/16 367/139 |
| 2013/0249218 A1 * | 9/2013 | Vassilev | ................ | A01M 29/16 290/55 |
| 2015/0230450 A1 * | 8/2015 | Norris | ................... | A01M 29/18 367/139 |
| 2016/0110973 A1 * | 4/2016 | Cho | ......................... | H04N 7/18 348/143 |

* cited by examiner

*Primary Examiner* — Hovhannes Baghdasaryan
(74) *Attorney, Agent, or Firm* — Jordan IP Law, LLC (57) ABSTRACT

Systems, apparatuses, and/or methods to protect an entity. A detector may detect an animal proximate to an entity based on sensor data from a plurality of sensors. The plurality of sensors may be positioned, for example, on the entity. In addition, a protector may administer a mechanical repellant from a protection device to repel the animal proximate to the entity. The mechanical repellant may include, for example, an ultrasound wave, a vibration wave, and so on. Moreover, the mechanical repellant may be specific to a type of animal to repel the animal proximate to the entity. The mechanical repellant may further be harmless to the animal (or the entity) and/or inapplicable to at least one other animal in the environment.

25 Claims, 4 Drawing Sheets

ADMINISTRATION OF A WILDLIFE REPELLANT TO PROTECT AN ENTITY

TECHNICAL FIELD

Embodiments generally relate to entity protection. More particularly, embodiments relate to application of a wildlife repellant to protect an entity.

BACKGROUND

An approach to protect an entity, such as an automobile, from wildlife may include applying a chemical repellant over a surface of the entity. For example, a coating or a wax may be applied to the surface of the automobile to minimize a corrosive effect of wildlife waste, provide waste removal, remove scratches, and so on. The coating or wax, however, may be a responsive approach rather than a proactive approach and/or may require a user to repeatedly apply the coating or the wax to the surface of the automobile. Another approach may include applying a textile repellant to protect the entity from wildlife. A user, however, may be required to repeatedly apply and remove a textile cover, which may not be feasible in certain situations. Conventional approaches may, therefore, compromise user convenience or waste resources. Thus, there remains room for improvement to provide entity protection from wildlife.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
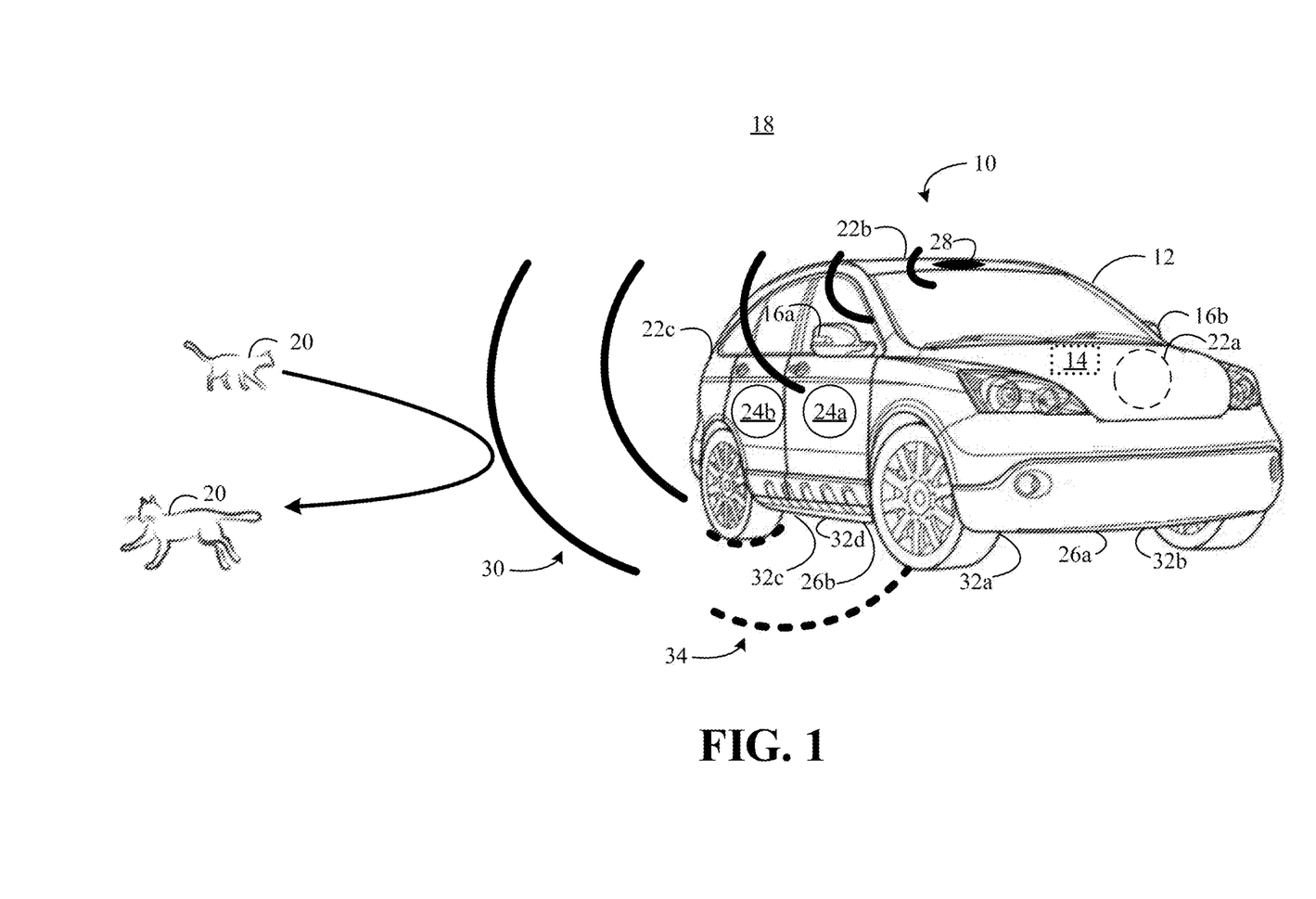
FIG. 1 is an illustration of an example of a system to protect an entity according to an embodiment.

Turning now to FIG. 1, a system 10 is shown to protect an entity, which may include a structure (e.g., a building, etc.), an individual (e.g., a person, an animal, a tree, etc.), a mobile transportation machine, etc. For example, the entity 12 may include a land transport vehicle (e.g., an automobile, a locomotive, a motorcycle, etc.), a sea transport vehicle (e.g., a boat, a shipping vessel, etc.), an air transport vehicle (e.g., a plane, a helicopter, etc.), a person, a domesticated animal, a home, and so on. In the illustrated example, the system 10 is deployed to protect a land transport vehicle 12 (an automobile).

The illustrated system 10 includes a processor 14 to execute logic (e.g., logic instructions, configurable logic, fixed-functionality logic hardware, etc., or any combination thereof) configured to implement any of the herein mentioned processes and/or entity protection technologies. The processor 14 may include, for example, a central processing unit (CPU) of a vehicle infotainment system that is coupled with one or more components such as a user interface (e.g., a graphical user interface (GUI), a tactile user interface, an audible user interface, etc.) a display screen (e.g., a liquid crystal diode screen, a touch screen, etc.), a data store (e.g., memory, hard drive, etc.), a communication interface, and so on. In one example, the user interface may provide operational context options to a user and/or may accept user input data to specify the operational context for any or all components of the system 10.

The communication interface may include communication functionality for a wide variety of purposes such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), LiFi (Light Fidelity, e.g., Institute of Electrical and Electronics Engineers/IEEE 802.15-7, Wireless Local Area Network/LAN Medium Access Control (MAC) and Physical Layer (PHY) Specifications), 4G LTE (Fourth Generation Long Term Evolution), Bluetooth (e.g., Institute of Electrical and Electronics Engineers/IEEE 802.15.1-2005, Wireless Personal Area Networks), WiMax (e.g., IEEE 802.16-2004, LAN/MAN Broadband Wireless LANS), Global Positioning System (GPS), spread spectrum (e.g., 900 MHz), NFC (Near Field Communication, ECMA-340, ISO/IEC 18092), and other radio frequency (RF) purposes. Thus, the communication interface may provide any or all data, processed and/or to be processed, to/from the processor 14, the data store, a handheld mobile computing platform of a user (e.g., a passenger, an administrator, etc.), and so on.

The illustrated system 10 further includes a plurality of sensors to generate sensor data. For example, the system 10 includes proximity sensors 16 (16a-16b) to generate proximity sensor data (e.g., presence, distance, etc.) for an object located proximate (e.g., relatively near, relatively close, within a predetermined distance such as maximum or minimum distance, etc.) to the vehicle 12. The proximity sensors 16 may be positioned, for example, on an exterior surface (e.g., bumper, door, panel, etc.) of the vehicle 12 and/or may face outwardly away from the vehicle 12 towards an environment 18 (e.g., outdoors, a driveway, a parking location, etc.) to generate proximity sensor data that indicates an object 20 is proximate to the vehicle 12.

The illustrated system 10 further includes weight sensors 22 (22a-22c) to generate weight sensor data (e.g., weight, force, etc.) for an object that is to be in contact with the vehicle 12. The weight sensors 22 may be positioned, for example, on an exterior surface (e.g., trunk, roof, hood, etc.) of the vehicle 12 and/or may face outwardly upward from the vehicle 12 towards the environment 18 to generate weight sensor data that indicates an object is in contact (e.g., landed, sitting, etc.) with the vehicle 12. In this regard, the object may include the object 20 or another object that may be related to the object 20 (e.g., waste, etc.) or unrelated to the object 20 (e.g., another animal, etc.).

The illustrated system 10 further includes image capture sensors 24 (24a-24b) to generate image sensor data (e.g., two-dimensional data, three-dimensional data, thermal data, etc.) for an object that is to be proximate (e.g., in motion adjacent to, etc.) to the vehicle 12. The image capture sensors 24 (e.g., infrared cameras, RGB-D cameras, etc.) may be positioned, for example, on an exterior surface (e.g., trunk, door, hood, panel, etc.) of the vehicle 12 and/or may face outwardly away from the vehicle 12 at a plurality of different angles towards the environment 18 to generate image sensor data (e.g., thermal data, etc.) that indicates an object is in motion adjacent (with or without contact) to the vehicle 12. In this regard, the object may include the object 20 or another object that may be related to the object 20 or unrelated to the object 20.

The illustrated system 10 further includes motion sensors 26 (26a-26b) to generate motion sensor data (e.g., velocity, acceleration, displacement, etc.) for an object that is to be proximate (e.g., in motion underneath, etc.) to the vehicle 12. The motion sensors 26 may be positioned, for example, on an exterior surface (e.g., frame, panel, part, etc.) of the vehicle 12 and/or may face outwardly downward from the vehicle 12 towards the environment 18 to generate motion sensor data that indicates an object is in in motion underneath (with or without contact) the vehicle 12. In this regard, the object may include the object 20 or another object that may be related to the object 20 or unrelated to the object 20.

Any or all of the plurality of sensors may be deployed in any position, combination, and/or orientation. Notably, any or all of the plurality of sensors may be deployed to advantageously provide a proactive approach to entity protection. In addition, utilizing a thermal imager (e.g., infrared camera, etc.) may advantageously provide image sensor data when an object is visually obstructed by, for example, an inanimate object, darkness, a shadow, and so on. Moreover, utilizing a motion sensor may advantageously provide motion sensor data to protect a passenger from being attacked by wildlife that is located underneath the vehicle 12.

The processor 14 may process the sensor data from any or all of the plurality of sensors to determine that the object 20 is wildlife and/or is a specific type of animal that is proximate to the vehicle 12 to advantageously provide a relatively more efficient and effective application of resources (e.g., via targeted repellent selection, etc.), to limit harm to the animal being repelled, to limit an impact to other animals in the habitat, etc. In the illustrated example, the processor 14 may analyze the sensor data and determine a characteristic of the object 20, such as size, shape, mass, posture, gate, movement, features, and so on. In addition, the processor 14 may determine that the object 20 is wildlife and/or is a specific type of animal based on the characteristic. For example, the processor 14 may compare the characteristic of the object 20 with reference data (e.g., reference size data, reference shape data, reference feature data, etc.) from a data store, a communication interface, etc., to determine the object 20 is an animal, to determine the object 20 is a specific type of animal (e.g., class, genus, species, etc.), and so on.

The processor 14 may also administer a mechanical repellant from a repellant device that is specific to the wildlife, a mechanical repellant that limits harm to the wildlife being repelled, a mechanical repellant that is inapplicable to other wildlife and/or domesticated animals, and so on. In this regard, the system 10 may administer a mechanical repellant on an ad-hoc basis. The illustrated system 10 includes an ultrasonic protection device 28 (e.g., ultrasonic transducer, etc.), which may be positioned on an external surface (e.g., hood, etc.) of the vehicle 12, to emit an ultrasound wave 30 at least through air in the environment 18 to repel the object 20. In addition, the illustrated system 10 includes vibration protection devices 32 (32a-32d) (e.g., mechanical vibrators, etc.), which may be positioned on an external surface (e.g., frame, panel, part, etc.) of the vehicle 12, to emit a vibration wave 34 at least through a vehicle part (e.g., a tire, a rim, etc.) and/or the ground of the environment 18. In one example, the vibration protection devices 32a-32d may be positioned near the wheels of the vehicle 12 to emit respective vibration waves 34 through respective tires, rims, etc.

The processor 14 may dynamically determine an appropriate combination of the protection devices 28, 32 to employ with or without user input data. The processor 14 may also dynamically determine an appropriate mechanical repellent to administer with or without user input data. For example, the processor 14 may dynamically select the mechanical repellant to be specific to the type of animal proximate to the vehicle 12. In one example, the processor 14 may set a frequency of the ultrasound wave 30 to be specific to the type of animal. The processor 14 may, for example, set the frequency to be about 55 Hz to about 77 kHz for a cat, about 64 Hz to about 44 kHz for a dog, about 50 Hz to about 29 kHz for a bird, about 100 Hz to about 40 kHz for a raccoon, etc.

The processor 14 may also set a vibration frequency for the vibration wave 34 specific to the type of animal based on, for example, energy content (e.g., destructive abilities of the vibration, etc.) for a particular context. For example, the processor 14 may set the vibration frequency to be about 30 Hz to about 500 Hz to repel a snake underneath the vehicle 12. Notably, human beings may not be impacted by the mechanical repellant since the range of sound may be set to be about 31 Hz to about 19 kHz. In addition, the vehicle 12 may not harmed by the mechanical repellant since the vibration may be set to be relatively low and/or may be tolerated by the vehicle 12.

Additionally, the processor 14 may select the mechanical repellant to be harmless to the object 20. For example, the processor 14 may set the volume of the ultrasound wave 30 to below about 120 dB (a level at which pain may be experienced) to confuse, disorient, intimidate, etc., without physical harm to the object 20. The processor 14 may process data to select the mechanical repellant such as, for example, data that indicates honeybees stop moving for up to 20 minutes for sounds from about 300 Hz to about 1 kHz at intensities from about 107 dB to about 120 dB, data that indicates flies of the order Diptera show a startle response from about 80 Hz to about 800 Hz at intensities at about 80 dB, data that indicates herrings show a startle response to changes in pressure (e.g., about 2 Pa to about 18 Pa, where 1 Pa=1 N/m2 and 120 dB=20 N/m2) at a frequency of about 70 Hz to about 200 Hz, data that indicates starlings are sensitive to repellent tones from about 1 kHz to about 7.5 kHz to about with a disturbance to feeding wherein response increases linearly in a range from about 50 dB to about 100 dB, etc.

The processor 14 may also account for a rate of attenuation of sound and/or vibration, which may be affected by the environment 18. For example, the processor 14 may process data that estimates attenuation at a range from about 5 dB/m for a bird 10 m above ground in an open field to about 20 dB/m for a bird on the ground in a coniferous forest. The processor 14 may further select a specific frequency and/or intensity based on the identification (e.g., class, genus, species, etc.) of the object 20. The processor 14 may, for example, select and/or emit a range of frequencies and/or intensities based on the identification of the object 20. For example, the processor 14 may select a range of frequencies and/or intensities that are specific to a single animal, that are common to a plurality of animals, that are specific to a plurality of animals, and so on.

The processor 14 may select the mechanical repellant to be inapplicable to other objects (e.g., other wildlife) in the environment 18. For example, the processor 14 may avoid selecting a frequency of the ultrasound wave 30 of about 30 kHz since animals (e.g., a dog, a bird, a raccoon, etc.) other than a target (e.g., a cat, etc.) in the environment 18 may also be inadvertently affected. In this case, the ultrasound wave 30 may be administered at a frequency of about 50 kHz to about 70 kHz (e.g., select a relatively higher end of this frequency range to minimize unwanted interference for repelling a cat). The processor 14 may, however, set the frequency of the ultrasound wave 30 to include about 30 kHz when the user indicates a boarder spectrum of animals are to be targeted, when the sensor data indicates that a plurality of animals having sensitivity to the specific mechanical repellant are proximate to the vehicle 12, and so on.

Accordingly, the processor 14 may tune the mechanical repellent based on known and/or determined sensitivity thresholds using data from, for example, a data store, a communication interface, and so on. The processor 14 may also select the appropriate protection device to be implemented based on a specific type of animal identified, may select the appropriate mechanical repellant to be implemented based on the specific type of animal identified, and so on. In this regard, ultrasonic frequencies may cause discomfort or startle an animal without harm to the animal but still cause the animal to avoid areas with ultrasonic disturbances. Vibrations may also confuse an animal into believing a dangerous condition exists to cause the animal to avoid areas with vibrational disturbances.

Additionally, a user interface may be used to specify an operational context for the system 10. For example, any or all of the plurality of sensors may be made unavailable (e.g., turned off, ignored, etc.) when instructed by a user internally via a user interface of an infotainment system and/or externally via a user interface of a mobile computing device that is paired with the processor 14, paired with any or all of the plurality of sensors, and so on. Any or all of the plurality of sensors may also be always made available (e.g., turned on, capturing sensor data, etc.) to protect the vehicle 12 when off, parked, idle, on, in motion, in use, and so on.

In one example where the protection devices 28, 32 are available, the vibration protection device 32 may be bypassed and/or omitted when the user specifies operation of only the ultrasonic protection device 28 for a particular type of animal (e.g., a cat, etc.), for a particular context that the object 20 is encountered (e.g., a predetermined distance from a door, predetermined environment, predetermined climate, predetermined time of day, week, year, etc.), etc. The vibration protection device 32 may also be automatically bypassed and/or omitted when the processor 14 determines that only the ultrasonic protection device 28 is needed to repel an animal (e.g., based on a type of animal, location of an animal, habitat, etc.).

While independent components have been shown for illustration purposes, it should be understood that one or more of the components of the system 10 may be combined, omitted, bypassed, re-arranged, and/or flow in any order. In one example, a vibration protection device may be omitted when the entity to be protected is an individual. In another example, the vibration protection device may integral with footwear of the individual. In this regard, a protection device, a sensor, a communication interface, etc., may be deployed and/or arranged in any wearable structure such as a wristband, a glove, a ring, eyeglasses, a belt-clip or a belt, an arm-band, a hat, a shirt, an undergarment, an outer garment, clothing generally, a collar (e.g., animal collar, shirt collar, etc.), and/or fashion accessories such as wallets, purses, umbrellas, and so on. Moreover, any or all components of the system 10 may be automatically implemented (e.g., without human intervention, etc.). For example, the processor 14 may automatically administer a mechanical repellant from a protection device when an animal is proximate to an entity.

Figure 2:
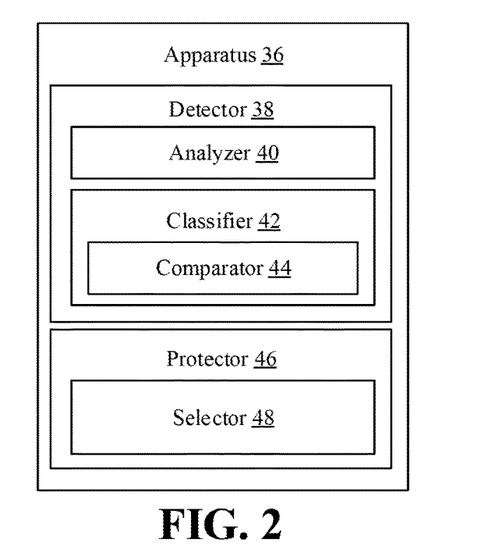
FIG. 2 is an illustration of an example of an apparatus to protect an entity according to an embodiment.

FIG. 2 shows an apparatus 36 to protect an entity according to an embodiment. The apparatus 36 may include logic (e.g., logic instructions, configurable logic, fixed-functionality logic hardware, etc., or any combination thereof) configured to implement any of the herein mentioned processes and/or entity protection technologies. The illustrated apparatus 36 includes a detector 38 to detect an animal proximate to an entity based on sensor data from a plurality of sensors. The plurality of sensors may include, for example, one or more proximity sensors to generate proximity sensor data for an object located proximate to the entity, one or more weight sensors to generate weight sensor data for an object in contact with the entity, one or more image capture sensors to generate image sensor data for an object in motion adjacent to the entity, one or more motion sensors to generate motion sensor data for an object in motion under the entity, and so on. The object may include, for example, an animal (e.g., a part of an animal, all of an animal, etc.), waste from an animal, and so on.

The illustrated detector 38 further includes an analyzer 40 to analyze the sensor data and determine a characteristic of the object. The characteristic may include, for example, object size, object shape, object mass, object posture, object gate, object movement, object features, and so on. In addition, the illustrated detector 38 includes a classifier 42 to determine a type of object based on, for example, the characteristic of the object. For example, the classifier includes a comparator 44 to compare the characteristic of the object with reference data (e.g., reference size data, reference shape data, reference feature data, etc.) to determine a type of animal for the object proximate to the entity. In one example, the reference data may be retrieved from a data store (e.g., memory, hard drive, etc.) and/or via a communication interface (e.g., network interface, etc.).

The apparatus 36 further includes a protector 46 to administer a mechanical repellant from a protection device to repel the animal proximate to the entity. In the illustrated example, the protector 46 includes a selector 48 to dynamically select the mechanical repellant to be specific to a type of animal to repel the animal. In one example, the selector 48 may select as the mechanical repellant an ultrasound wave to be emitted from an ultrasonic protection device at least through air to repel the animal proximate to the entity. In another example, the selector 48 may select as the mechanical repellant a vibration wave to be emitted from a vibration protection device at least through a part of the entity to repel the animal proximate to the entity.

Additionally, the selector 48 may dynamically select the mechanical repellant to be harmless to the animal to be repelled and/or inapplicable to at least one other animal in the environment. For example, the selector 48 may set a frequency for an ultrasound wave that is specific to a type of animal proximate to the entity that will not harm the animal (or the entity) and/or will not impact at least one other animal (e.g., a domesticated animal, another wildlife animal, etc.) in the environment. In one example, the selector 48 may set the frequency of the ultrasound wave to be about 50 kHz to about 70 kHz and the intensity to be about 80 dB when the type of animal is a cat. Thus, the mechanical repellant would not harm the cat (or the entity) or impact other animals in the environment such as, for example, a domesticated dog, a wildlife bird, and so on.

The selector 48 may also utilize a frequency and/or intensity that will simultaneously impact more than one animal. For example, the selector 48 may set the frequency of the ultrasound wave to be about 30 kHz and an intensity of about 100 dB when various dogs, cats, raccoons, etc., are proximate to the entity and/or are targets of the mechanical repellant. The selector 48 may also cycle through a set or range of frequencies and/or intensities to target one or more animals with one or more mechanical repellants. Additionally, any or all of the herein mentioned processes and/or entity protection technologies included in and/or implemented by the apparatus 36 may be based on user input, pre-determined policies/rules, and so on. Thus, for example, the selector 48 may select the appropriate mechanical repellant ad-hoc based on knowledge of a user preference, policy/rule, and so on.

While examples have provided various components of the apparatus 36 for illustration purposes, it should be understood that one or more components of the apparatus 36 may reside in the same and/or different physical and/or virtual locations, may be combined, omitted, bypassed, re-arranged, and/or be utilized in any order. In addition, the apparatus 36 may include one or more other components, such as a processor, a data store, a communication interface, a user interface, and so on. Moreover, any or all components of the apparatus 36 may be automatically implemented (e.g., without human intervention, etc.). For example, the protector 46 may automatically administer a mechanical repellant from a protection device when an animal is proximate to an entity.

Figure 3:
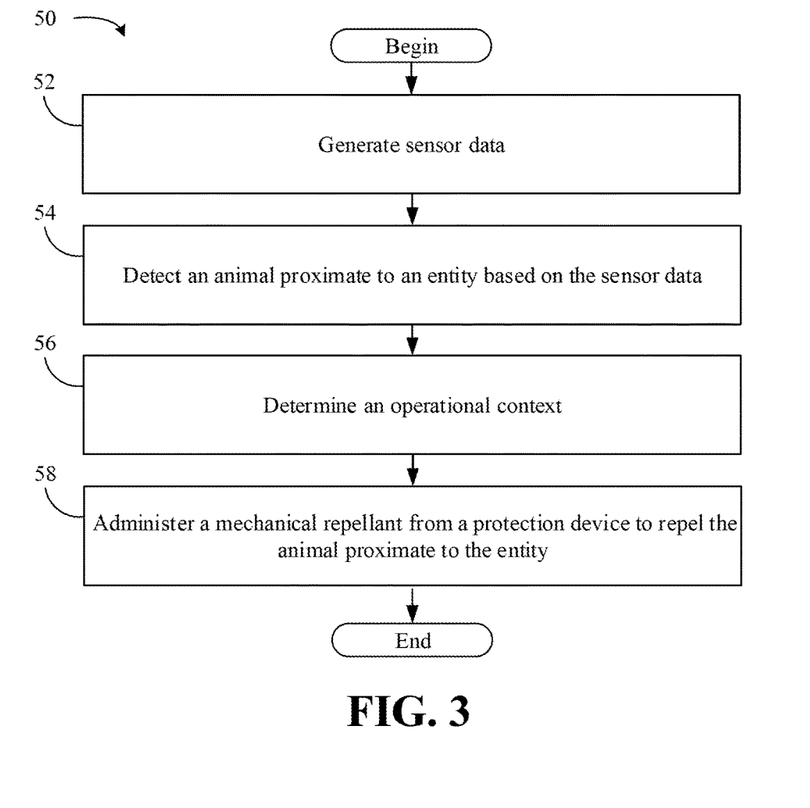
FIG. 3 is a flowchart of an example of a method to protect an entity according to an embodiment.

Turning now to FIG. 3, a method 50 is shown to protect an entity according to an embodiment. The method 50 may be implemented as a module or related component in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 50 may be written in any combination of one or more programming languages, including an object oriented programming language such as JAVA, SMALLTALK, C++ or the like and conventional procedural programming languages, such as the "C" programming language or similar programming languages.

Illustrated processing block 52 provides for generating sensor data. For example, block 52 may generate proximity sensor data, weight sensor data, image sensor data, motion sensor data, and so on. Thus, for example, block 52 may generate proximity sensor data for an object located proximate to the entity, proximity sensor data for an object located proximate to the entity, image sensor data for an object in motion adjacent to the entity, motion sensor data for an object in motion under the entity, and so on.

Illustrated processing block 54 provides for detecting an animal proximate to the entity based on the sensor data. In one example, block 54 may provide for analyzing the sensor data to determine a characteristic of an object proximate to the entity. In addition, block 54 may provide for determining a type of object, such as a type of animal proximate to the entity, based on the characteristic of the object. In one example, block 54 may provide for comparing the characteristic of the object with reference data to determine the type of animal for the animal proximate to the entity.

Illustrated processing block 56 provides for determining an operational context. For example, any or all of a plurality of sensors may be made unavailable, may be always made available to protect the entity, and so on. In addition, the operational context may relate to a state of the entity. In this regard, an appropriate and/or pre-determined protection technology may be administered when, for example, a vehicle is off, parked, idle, on, in motion, in use, and so on. Moreover, an appropriate and/or pre-determined protection technology may be administered when, for example, an individual is idle (e.g., sitting, sleeping, etc.), in motion (e.g., eating, walking, running, swimming, etc.), involved in a specific activity (e.g., at work, at an event, etc.), and so on. In one example, an operational context may be specified via a user interface, may be specified via predetermined policies/rules, and so on.

Illustrated processing block 58 provides for administering a mechanical repellant from a protection device to repel the animal proximate to the entity. Block 58 may provide for dynamically selecting the mechanical repellant to be specific to a type of animal to repel the animal proximate to the entity. Block 58 may provide for dynamically selecting the mechanical repellant further to be harmless to the animal (or the entity) and/or inapplicable to at least one other animal. In one example, bock 58 may further provide for emitting as the mechanical repellant an ultrasound wave at least through air to repel the animal proximate to the entity. In another example, block 58 may provide for emitting as the mechanical repellant a vibration wave at least through a part of the entity to repel the animal proximate to the entity.

While independent blocks and/or a particular order has been shown for illustration purposes, it should be understood that one or more of the blocks of any of the method 50 may be combined, omitted, bypassed, re-arranged, and/or flow in any order. Moreover, any or all blocks of the method 50 may be automatically implemented (e.g., without human intervention, etc.). For example, block 58 may automatically administer a mechanical repellant from a protection device when an animal is proximate to an entity.

Figure 4:
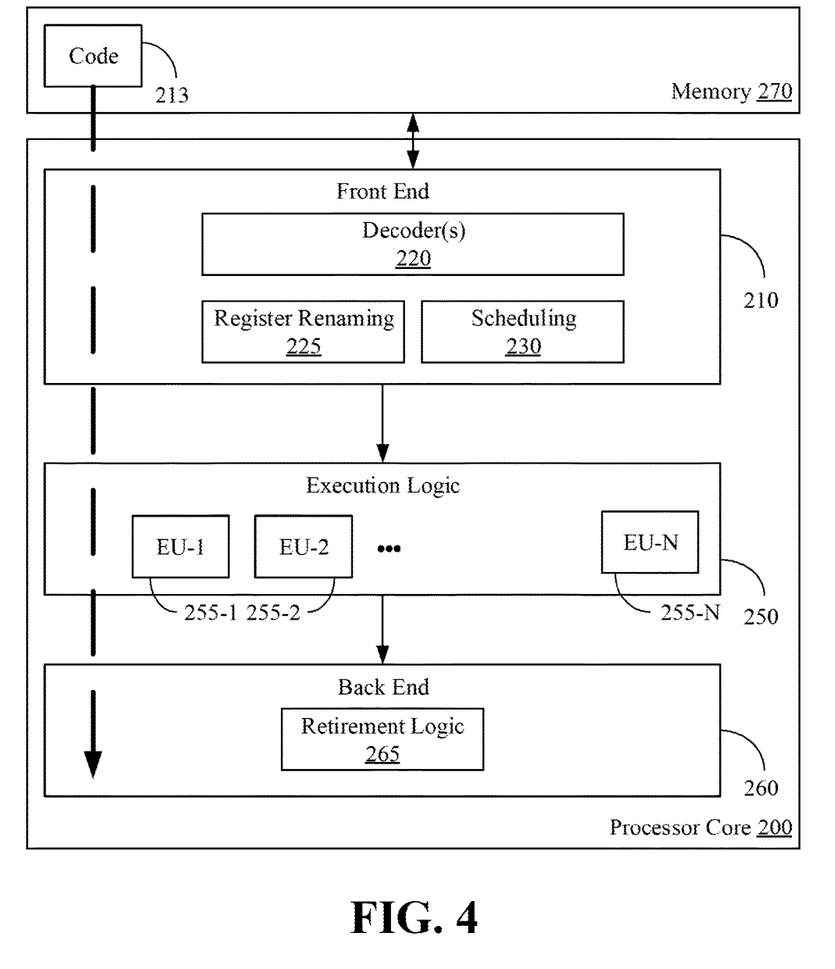
FIG. 4 is a block diagram of an example of a processor according to an embodiment.

Turning now to FIG. 4, a processor core 200 is shown according to one embodiment. The processor core 200 may be the core for any type of processor, such as a microprocessor, an embedded processor, a digital signal processor (DSP), a network processor, or other device to execute code. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement the system 10 (FIG. 1), the apparatus 36 (FIG. 2), and/or the method 50 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
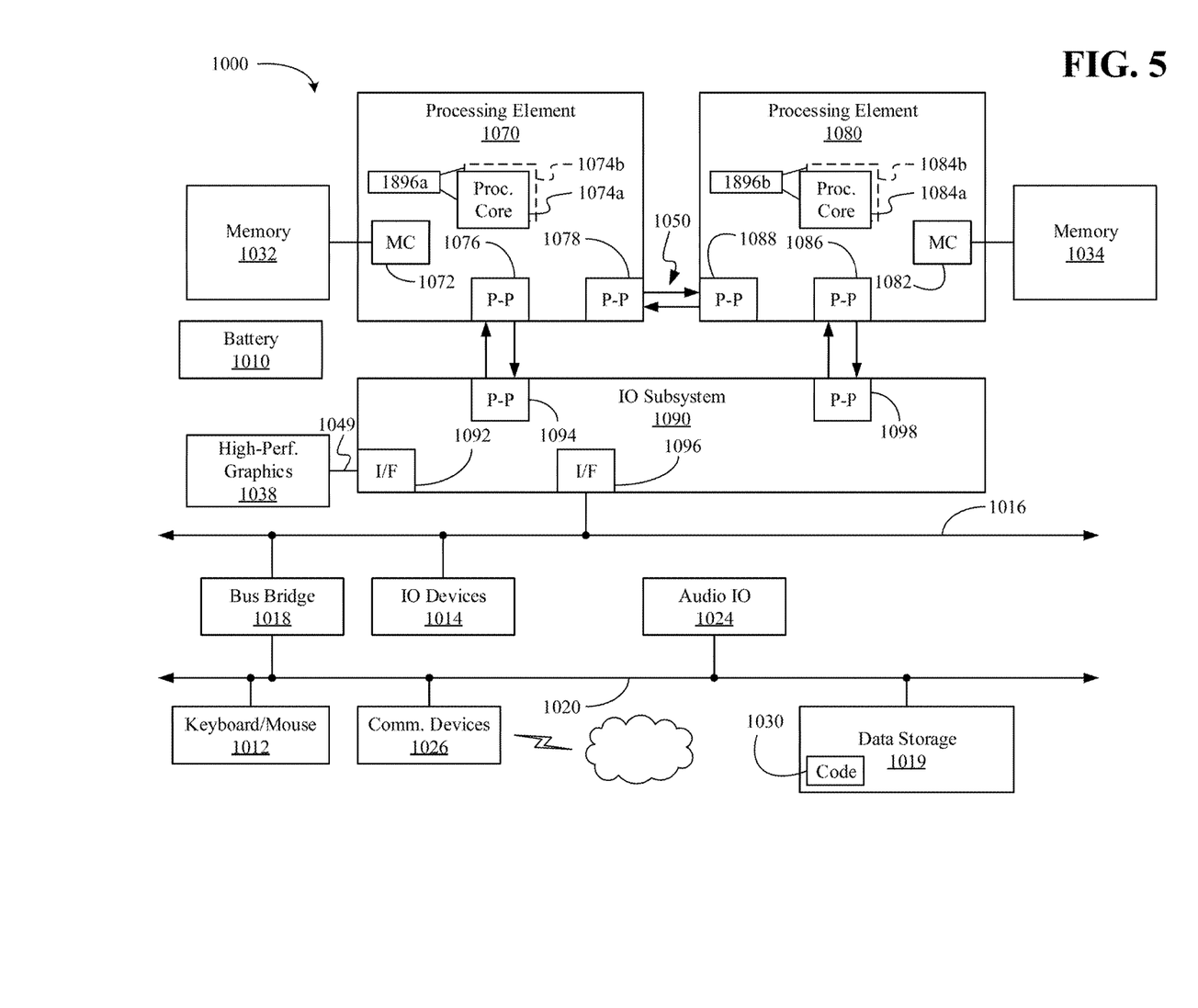
FIG. 5 is a block diagram of an example of a computing system according to an embodiment.

Referring now to FIG. 5, shown is a block diagram of a computing system 1000 embodiment in accordance with an embodiment. Shown in FIG. 5 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 4.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 5, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 5, various I/O devices 1014 (e.g., cameras, sensors, etc.) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The illustrated code 1030 may implement the system 10 (FIG. 1), the apparatus 36 (FIG. 2), and/or the method 50 (FIG. 3), already discussed, and may be similar to the code 213 (FIG. 4), already discussed. Further, an audio I/O 1024 may be coupled to second bus 1020 and a battery 1010 may supply power to the computing system 1000.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Additional Notes and Examples

Example 1 may include apparatus to protect an entity comprising a detector to automatically detect an animal proximate to an entity based on sensor data from a plurality of sensors on the entity and a protector to automatically administer a mechanical repellant from a protection device to repel the animal proximate to the entity.

Example 2 may include the apparatus of Example 1, wherein the plurality of sensors is to include one or more proximity sensors to generate proximity sensor data for an object that is to be located proximate to a vehicle, one or more weight sensors to generate weight sensor data for an object that is to be in contact with the vehicle, one or more image capture sensors to generate image sensor data for an object that is to be in motion adjacent to the vehicle, and one or more motion sensors to generate motion sensor data for an object that is to be in motion under the vehicle.

Example 3 may include the apparatus of any one of Examples 1 to 2, wherein a proximity sensor is to face outwardly away from the entity towards an environment, wherein a weight sensor is face outwardly upward from the entity towards the environment, wherein an infrared sensor to face outwardly away from the entity at a plurality of different angles towards the environment, and wherein a motion sensor is to face outwardly downward from the entity towards the environment.

Example 4 may include the apparatus of any one of Examples 1 to 3, further including an analyzer to analyze the sensor data to determine a characteristic of an object and a classifier to determine a type of animal for the animal proximate to the entity based on the characteristic of the object.

Example 5 may include the apparatus of any one of Examples 1 to 4, further including a comparator to compare the characteristic of the object with reference data to determine the type of animal for the animal proximate to the entity.

Example 6 may include the apparatus of any one of Examples 1 to 5, further including a selector to dynamically select the mechanical repellant to be specific to a type of animal to repel the animal proximate to the entity.

Example 7 may include the apparatus of any one of Examples 1 to 6, wherein the selector is to dynamically select the mechanical repellant further to be harmless to the animal and inapplicable to at least one other animal.

Example 8 may include the apparatus of any one of Examples 1 to 7, further including a user interface to specify an operational context for the apparatus.

Example 9 may include the apparatus of any one of Examples 1 to 8, further including an ultrasonic protection device to emit as the mechanical repellant an ultrasound wave at least through air to repel the animal proximate to the entity and a vibration protection device to emit as the mechanical repellant a vibration wave at least through a part of the entity to repel the animal proximate to the entity.

Example 10 may include at least one computer readable storage medium comprising a set of instructions, which when executed by a processor, cause the processor to automatically detect an animal proximate to an entity based on sensor data from a plurality of sensors on the entity and automatically administer a mechanical repellant from a protection device to repel the animal proximate to the entity.

Example 11 may include the at least one computer readable storage medium of Example 10, wherein the instructions, when executed, cause the processor to generate proximity sensor data for an object that is to be located proximate to a vehicle, generate weight sensor data for an object that is to be in contact with the vehicle, generate image sensor data for an object that is to be in motion adjacent to the vehicle, and generate motion sensor data for an object that is to be in motion under the vehicle.

Example 12 may include the at least one computer readable storage medium of any one of Examples 10 to 11, wherein the instructions, when executed, cause the processor to analyze the sensor data to determine a characteristic of an object, and determine a type of animal for the animal proximate to the entity based on the characteristic of the object.

Example 13 may include the at least one computer readable storage medium of any one of Examples 10 to 12, wherein the instructions, when executed, cause the processor to compare the characteristic of the object with reference data to determine the type of animal for the animal proximate to the entity.

Example 14 may include the at least one computer readable storage medium of any one of Examples 10 to 13, wherein the instructions, when executed, cause the processor to dynamically select the mechanical repellant to be specific to a type of animal to repel the animal proximate to the entity.

Example 15 may include the at least one computer readable storage medium of any one of Examples 10 to 14, wherein the instructions, when executed, cause the processor to dynamically select the mechanical repellant further to be harmless to the animal and inapplicable to at least one other animal.

Example 16 may include the at least one computer readable storage medium of any one of Examples 10 to 15, wherein the instructions, when executed, cause the processor to specify an operational context for the apparatus.

Example 17 may include the at least one computer readable storage medium of any one of Examples 11 to 16, wherein the instructions, when executed, cause the processor to emit as the mechanical repellant an ultrasound wave at least through air to repel the animal proximate to the entity and emit as the mechanical repellant a vibration wave at least through a part of the entity to repel the animal proximate to the entity.

Example 18 may include a method to protect an entity comprising automatically detecting an animal proximate to an entity based on sensor data from a plurality of sensors on the entity and automatically administering a mechanical repellant from a protection device to repel the animal proximate to the entity.

Example 19 may include the method of Example 18, further including generating proximity sensor data for an object located proximate to a vehicle, generating weight sensor data for an object in contact with the vehicle, generating image sensor data for an object in motion adjacent to the vehicle. and generating motion sensor data for an object in motion under the vehicle.

Example 20 may include the method of any one of Examples 18 to 19, further including analyzing the sensor data to determine a characteristic of an object and determining a type of animal for the animal proximate to the entity based on the characteristic of the object.

Example 21 may include the method of any one of Examples 18 to 20, further including further including comparing the characteristic of the object with reference data to determine the type of animal for the animal proximate to the entity.

Example 22 may include the method of any one of Examples 18 to 21, further including further including dynamically selecting the mechanical repellant to be specific to a type of animal to repel the animal proximate to the entity.

Example 23 may include the method of any one of Examples 18 to 22, further including further including dynamically selecting the mechanical repellant further to be harmless to the animal and inapplicable to at least one other animal.

Example 24 may include the method of any one of Examples 18 to 23, further including further including specifying an operational context for the apparatus.

Example 25 may include the method of any one of Examples 18 to 24, further including emitting as the mechanical repellant an ultrasound wave at least through air to repel the animal proximate to the entity and emitting as the mechanical repellant a vibration wave at least through a part of the entity to repel the animal proximate to the entity.

Example 26 may include an apparatus to protect an entity comprising means for performing the method of any one of Examples 18 to 25.

Thus, techniques described herein may protect an entity (e.g., a vehicle) from wildlife. For example, a mechanical repellant may be administered to repel an animal and/or protect a vehicle from damage that may be caused by the animal (e.g., from waste, from contact, etc.). In addition, the mechanical repellant may be administered to be minimally impactful to the animal, to other animals that are not targets of the mechanical repellant but are within effective range of mechanical repellant, to the natural environment (e.g., ecology, habitat, etc.), and so on. Techniques described herein may also protect a user of a vehicle from wildlife that may be hidden and/or unseen from a user field of view.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so on" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   a detector to automatically detect an animal proximate to an entity based on sensor data from a plurality of sensors on the entity,
   a selector to dynamically select a mechanical repellant to be specific to a type of animal to repel the animal proximate to the entity, and
   a protector to automatically administer the mechanical repellant from a protection device to repel the animal proximate to the entity.

2. The apparatus of claim 1, wherein the plurality of sensors is to include,
   one or more proximity sensors to generate proximity sensor data for an object that is to be located proximate to a vehicle,
   one or more weight sensors to generate weight sensor data for an object that is to be in contact with the vehicle,
   one or more image capture sensors to generate image sensor data for an object that is to be in motion adjacent to the vehicle, and
   one or more motion sensors to generate motion sensor data for an object that is to be in motion under the vehicle.

3. The apparatus of claim 1, wherein a proximity sensor is to face outwardly away from the entity towards an environment, wherein a weight sensor is face outwardly upward from the entity towards the environment, wherein an infrared sensor to face outwardly away from the entity at a plurality of different angles towards the environment, and wherein a motion sensor is to face outwardly downward from the entity towards the environment.

4. The apparatus of claim 1, further including,
an analyzer to analyze the sensor data to determine a characteristic of an object, and
a classifier to determine the type of animal for the animal proximate to the entity based on the characteristic of the object.

5. The apparatus of claim 4, further including a comparator to compare the characteristic of the object with reference data to determine the type of animal for the animal proximate to the entity.

6. The apparatus of claim 1, wherein the selector is to dynamically select the mechanical repellant further to be harmless to the animal and inapplicable to at least one other animal.

7. The apparatus of claim 1, further including a user interface to specify an operational context for the apparatus.

8. The apparatus of claim 1, further including,
an ultrasonic protection device to emit as the mechanical repellant an ultrasound wave at least through air to repel the animal proximate to the entity, and
a vibration protection device to emit as the mechanical repellant a vibration wave at least through a part of the entity to repel the animal proximate to the entity.

9. At least one non-transitory computer readable storage medium comprising a set of instructions, which when executed by a processor, cause the processor to:
automatically detect an animal proximate to an entity based on sensor data from a plurality of sensors on the entity;
dynamically select a mechanical repellant to be specific to a type of animal to repel the animal proximate to the entity; and
automatically administer the mechanical repellant from a protection device to repel the animal proximate to the entity.

10. The at least one non-transitory computer readable storage medium of claim 9, wherein the instructions, when executed, cause the processor to:
generate proximity sensor data for an object that is to be located proximate to a vehicle;
generate weight sensor data for an object that is to be in contact with the vehicle;
generate image sensor data for an object that is to be in motion adjacent to the vehicle; and
generate motion sensor data for an object that is to be in motion under the vehicle.

11. The at least one non-transitory computer readable storage medium of claim 9, wherein the instructions, when executed, cause the processor to:
analyze the sensor data to determine a characteristic of an object; and
determine the type of animal for the animal proximate to the entity based on the characteristic of the object.

12. The at least one non-transitory computer readable storage medium of claim 11, wherein the instructions, when executed, cause the processor to compare the characteristic of the object with reference data to determine the type of animal for the animal proximate to the entity.

13. The at least one non-transitory computer readable storage medium of claim 9, wherein the instructions, when executed, cause the processor to dynamically select the mechanical repellant further to be harmless to the animal and inapplicable to at least one other animal.

14. The at least one non-transitory computer readable storage medium of claim 9, wherein the instructions, when executed, cause the processor to specify an operational context for the apparatus.

15. The at least one non-transitory computer readable storage medium of claim 9, wherein the instructions, when executed, cause the processor to:
emit as the mechanical repellant an ultrasound wave at least through air to repel the animal proximate to the entity; and
emit as the mechanical repellant a vibration wave at least through a part of the entity to repel the animal proximate to the entity.

16. A method comprising:
automatically detecting an animal proximate to an entity based on sensor data from a plurality of sensors on the entity;
dynamically selecting a mechanical repellant to be specific to a type of animal to repel the animal proximate to the entity; and
automatically administering the mechanical repellant from a protection device to repel the animal proximate to the entity.

17. The method of claim 16, further including:
generating proximity sensor data for an object located proximate to a vehicle;
generating weight sensor data for an object in contact with the vehicle;
generating image sensor data for an object in motion adjacent to the vehicle; and
generating motion sensor data for an object in motion under the vehicle.

18. The method of claim 16, further including:
analyzing the sensor data to determine a characteristic of an object; and
determining the type of animal for the animal proximate to the entity based on the characteristic of the object.

19. The method of claim 18, further including comparing the characteristic of the object with reference data to determine the type of animal for the animal proximate to the entity.

20. The method of claim 16, further including dynamically selecting the mechanical repellant further to be harmless to the animal and inapplicable to at least one other animal.

21. The method of claim 16, further including specifying an operational context for the apparatus.

22. The method of claim 16, further including:
emitting as the mechanical repellant an ultrasound wave at least through air to repel the animal proximate to the entity; and
emitting as the mechanical repellant a vibration wave at least through a part of the entity to repel the animal proximate to the entity.

23. An apparatus comprising:
a detector to automatically detect an animal proximate to an entity based on sensor data from a plurality of sensors on the entity, wherein the plurality of sensors is to include one or more proximity sensors to generate proximity sensor data for an object that is to be located proximate to a vehicle, one or more weight sensors to generate weight sensor data for an object that is to be in contact with the vehicle, one or more image capture sensors to generate image sensor data for an object that is to be in motion adjacent to the vehicle, and one or more motion sensors to generate motion sensor data for an object that is to be in motion under the vehicle, and a protector to automatically administer a mechanical repellant from a protection device to repel the animal proximate to the entity.

24. At least one non-transitory computer readable storage medium comprising a set of instructions, which when executed by a processor, cause the processor to:

automatically detect an animal proximate to an entity based on sensor data from a plurality of sensors on the entity, wherein the processor is to generate proximity sensor data for an object that is to be located proximate to a vehicle, generate weight sensor data for an object that is to be in contact with the vehicle, generate image sensor data for an object that is to be in motion adjacent to the vehicle, and generate motion sensor data for an object that is to be in motion under the vehicle; and automatically administer a mechanical repellant from a protection device to repel the animal proximate to the entity.

25. A method comprising:

automatically detecting an animal proximate to an entity based on sensor data from a plurality of sensors on the entity, the method including generating proximity sensor data for an object located proximate to a vehicle, generating weight sensor data for an object in contact with the vehicle, generating image sensor data for an object in motion adjacent to the vehicle, and generating motion sensor data for an object in motion under the vehicle; and automatically administering a mechanical repellant from a protection device to repel the animal proximate to the entity.

* * * * *